May 9, 1950          C. W. ASHLEY          2,507,328

VEHICLE DOOR LOCK MECHANISM

Filed Oct. 6, 1945

INVENTOR.
CECIL W. ASHLEY
BY
A. B. Bowman
ATTORNEY

Patented May 9, 1950

2,507,328

UNITED STATES PATENT OFFICE 2,507,328

VEHICLE DOOR LOCK MECHANISM

Cecil W. Ashley, El Centro, Calif.

Application October 6, 1945, Serial No. 620,737

2 Claims. (Cl. 292—38)

My invention relates to a vehicle door lock mechanism and the objects of my invention are:

First, to provide a door lock which is automatically controlled by the movement of the front seat cushion, that is, when the driver's seat is occupied depression of the driver's seat cushion locks the rear doors of the vehicle and when pressure is released from the driver's seat cushion the doors are unlocked.

Second, to provide a vehicle door lock which is used independently of and in addition to the regular door locks on the vehicle.

Third, to provide a device of this character which is completely protected from tampering by anyone in the rear seat so that a child or other person cannot inadvertently or intentionally render the device ineffective.

Fourth, to provide a device of this character which will not in any way interfere with the normal functioning of the vehicle.

Fifth, to provide a device of this character which is inexpensive and practicable to manufacture, completely automatic in use, and constructed to give efficient and durable service without frequent repair or adjustment.

Figure 1:
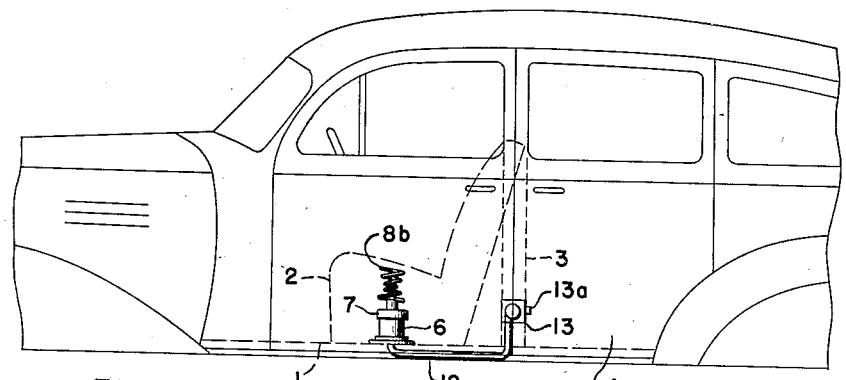
Figure 2:
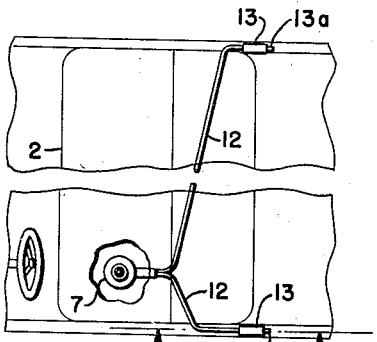
Figures 3, 4:
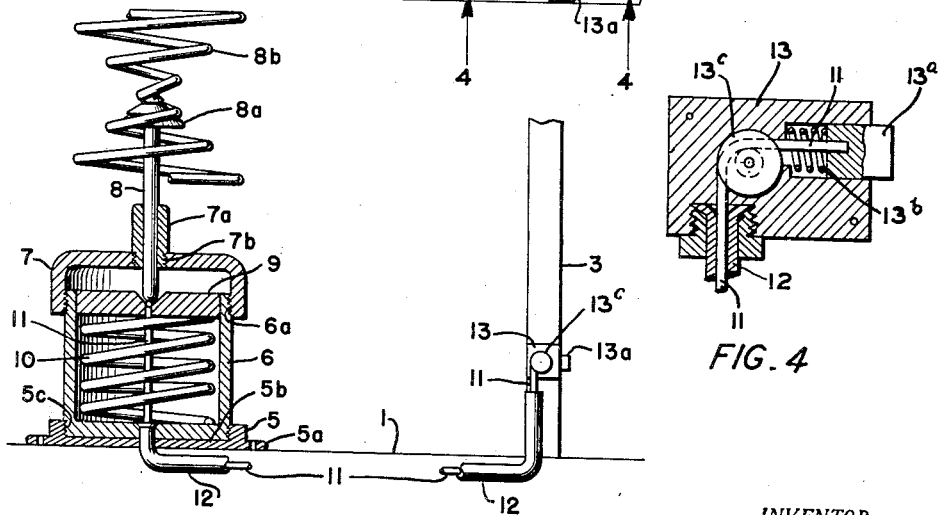

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereof which form a part of this specification in which:

Figure 1 is a fragmentary side elevational view of my invention operatively installed on an automobile, with portions broken away and in section to facilitate the illustration; Fig. 2 is a fragmentary and diagrammatic plan view to generally indicate how two flexible cables may be secured to the same actuator at the driver's seat, the cables being routed to door locks on each side of the automobile; Fig. 3 is a detail view, largely in vertical cross section, of principal portions of my invention and Fig. 4 is a sectional view taken from the line 4—4 of Fig. 2.

Similar characters of reference refer to similar or identical parts and portions throughout the several views.

The vehicle floor 1, seat 2, vertical sill 3, rear doors 4, flanged base 5, cylinder 6, cap guide 7, actuator plunger 8, floating disc 9, spring 10, flexible cable 11, cable guide pipes 12, and door lock 13 constitute the principal parts and portions of my invention and the parts of the vehicle with which my device is combined.

The vehicle on which my invention is mounted will normally have a floor 1 underneath the front seat 2 of the vehicle, a vertical sill 3 which functions as a rear door jamb and on which door locks may be mounted, and rear doors 4.

My invention envisages mounting on the floor 1 a flanged base 5, the exterior flange portion 5a being adapted to be secured to the floor 1 by screws and the web or interior flange portion 5b having two holes drilled therein for the purpose hereinafter described. The cylindrical portion of the base is hollow and internally threaded as at 5c to receive the lower threaded end of the hollow cylinder 6 which is also threaded at the top end as at 6a to engage the internally threaded cap guide 7. The externally threaded sleeve 7a is secured in a threaded hole in the top of the cap 7 as at 7b and this sleeve guides the actuator plunger 8 in a vertical direction. On the upper end of this plunger 8 a pad 8a is secured and this pad is adapted to contact the middle of a helical spring 8b inserted within the cushion of the front seat 2.

The plunger 8 extends downwardly to contact the upper face of the floating disc 9 which is urged upwardly in the cylinder 6 by the helical spring 10 inserted between said disc 9 and the internal surface of the bottom of the cylinder 6.

Secured to this disc 9 and depending therefrom through the spring 10 are two flexible cables 11 which pass through the holes in the base flange 5b referred to above into cable guide pipes 12, a plurality of which are located where necessary to route the cable 11 from the base 5 to the door locks 13.

These door locks 13 may be standard spring controlled door locks and the cables 11 are operatively secured to the locks so that tension on the cables withdraws the bolts of the locks against the springs 13b shown in Fig. 4 and allows the doors to be opened. When, however, the tension on the cables 11 is released the bolts 13a of the locks are extended by the springs 13b locking the doors.

In use my invention is completely automatic, pressure on the spring 8b when the driver is seated in the driver's seat causing the depression of the pad 8a, plunger 8, and disc 9 releasing tension on the cables 11 and allowing the locks 13 to remain in door-locking position. When the driver leaves his seat, the helical spring 10 forces the floating disc 9 upwardly in the cylinder 6 tightening the cables 11 and releasing the locks 13 so that the doors 4 may be opened.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claim.

Having thus described my invention, what I claim as new and desire to secure by Letters Patent is:

1. In a vehicle door lock mechanism of the character described for a door lock the combination of an automobile driver's horizontal seat cushion, a spring loaded plunger positioned in said cushion, a yieldable connection between said cushion and said plunger, and a flexible cable operatively connecting said plunger to said door lock.

2. In a vehicle door lock mechanism of the character described for a door lock, the combination of the horizontal seating portion of an automobile seat, a hollow cylinder mounted in said seating portion, a floating disc within said cylinder, a cap on said cylinder, a plunger reciprocatively mounted in said cap, a yieldable coil spring connection between said plunger and said cushion, a helical spring in said cylinder adapted to urge said floating disc in one direction, and a flexible cable operatively connecting said door lock with said disc.

CECIL W. ASHLEY.

REFERENCES CITED

The following references are of record in the file of this patent:

UNITED STATES PATENTS

| Number | Name | Date |
| --- | --- | --- |
| 912,379 | Jackson | Feb. 16, 1909 |
| 1,776,265 | Martel | Sept. 23, 1930 |
| 2,084,045 | Olsen | June 15, 1937 |
| 2,174,231 | Vandeveld | Sept. 26, 1939 |
| 2,344,826 | Le Gresley | Mar. 21, 1944 |